United States Patent
Tanimoto

(10) Patent No.: US 7,318,084 B2
(45) Date of Patent: Jan. 8, 2008

(54) COMMUNICATION DEVICE AND METHOD FOR CONTROLLING COMMUNICATION DEVICE

(75) Inventor: Yoshifumi Tanimoto, Hirakata (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 809 days.

(21) Appl. No.: 10/325,146

(22) Filed: Dec. 20, 2002

(65) Prior Publication Data
US 2003/0126219 A1    Jul. 3, 2003

(30) Foreign Application Priority Data
Dec. 27, 2001   (JP) ............... 2001-396752

(51) Int. Cl.
*G06F 15/16* (2006.01)
(52) U.S. Cl. ............ 709/205; 709/206; 709/218; 709/221
(58) Field of Classification Search ............ None
See application file for complete search history.

(56) References Cited

U.S. PATENT DOCUMENTS

| | | | | |
|---|---|---|---|---|
| 6,003,070 A | * | 12/1999 | Frantz | 709/206 |
| 6,697,942 B1 | * | 2/2004 | L'Heureux et al. | 713/152 |
| 6,898,623 B1 | * | 5/2005 | Williams et al. | 709/206 |
| 6,912,126 B2 | * | 6/2005 | Rudd et al. | 361/686 |
| 6,931,447 B1 | * | 8/2005 | Hemstreet et al. | 709/227 |
| 7,062,535 B1 | * | 6/2006 | Stark et al. | 709/206 |
| 2003/0086122 A1 | * | 5/2003 | Parry | 358/402 |

FOREIGN PATENT DOCUMENTS

| | | |
|---|---|---|
| JP | 06-252944 | 9/1994 |
| JP | 10-055321 | 2/1998 |
| JP | 10-063724 | 3/1998 |
| JP | 11-196184 | 7/1999 |
| JP | 2000-029648 | 1/2000 |
| JP | 2000-165587 | 6/2000 |
| JP | 2000-224221 | 8/2000 |
| JP | 2000-353113 | 12/2000 |
| JP | 2001-256129 | 9/2001 |
| JP | 2001-346279 | 12/2001 |

* cited by examiner

*Primary Examiner*—Bunjob Jaroenchonwanit
*Assistant Examiner*—Van Kim T. Nguyen
(74) *Attorney, Agent, or Firm*—Hogan & Hartson LLP

(57) ABSTRACT

A communication device includes a communication unit that can transmit and receive an electronic mail message via a network. The communication device also includes a control unit forming a device setting form-data described as a structured document, transmitting the formed device setting form-data as an electronic mail message from the communication unit, and updating device setting by a device setting data received as the electronic mail message by the communication unit.

20 Claims, 6 Drawing Sheets

FIG. 3

From:sampleA@sample.co.jp
Date:Fri, 21 Dec 2001 14:58:09 +0900
To:sampleB@sample.co.jp
Subject:Sample
Message-id:<0020CA4349256B29@sample.co.jp>
MIME-Version:1.0
Content-Type:multipart/mixed;
    boundary="=_0020DBFB49256B290020CA4349256B29_="

--=_0020DBFB49256B290020CA4349256B29_=
Content-Type:text/plain;charset="iso-2022-jp"
Content-Transfer-Encoding:7bit (See attached file: FormSample.htm)

-FormSample.htm
--=_0020DBFB49256B290020CA4349256B29_=
Content-Type:application/octet-stream; name="FormSample.htm"
Content-Transfer-Encoding:base64
Content-Disposition:attachment;filename="FormSample.htm"

PCFET0NUWVBFIEhUTUwg ········

········

Qk9EWT4NCjwvSFRNTD4NCg==

DEVICE SETTING FORM-DATA (MIME ENCODE)

--=_0020DBFB49256B290020CA4349256B29_=--

FIG. 4

```
<!DOCTYPE HTML PUBLIC "-//W3C//DTD HTML 4.0 Transitional//EN">
<HTML lang="ja">
<HEAD>
<META http-equiv="Content-Type" content="text/html; charset=Shift_JIS">
<META http-equiv="Content-Style-Type" content="text/css">
<TITLE>sample.htm</TITLE>
<BASE target="main">
</HEAD>
<BODY bgcolor="white">
<H1>■NETWORK SETTING</H1>
<HR>
<FORM enctype="multipart/form-data"
        action="mailto:sampleA@sample.co.jp"      ← ELECTRONIC MAIL ADDRESS
        method=POST>                                 OF RETURN DESTINATION
<TABLE bgcolor="#FFFFFF" border="1" cellspacing="2" cellpadding="5">
<TR>
<TD nowrap bgcolor="#99CCCC" align="left" valign="middle">
  IP address</TD>
<TD nowrap bgcolor="#CCCCCC" align="left" valign="middle">
<NOBR>
<INPUT type=text name="ip4" size="3" maxlength="3" value="">
.
<INPUT type=text name="ip3" size="3" maxlength="3" value="">
.
<INPUT type=text name="ip2" size="3" maxlength="3" value="">
.
<INPUT type=text name="ip1" size="3" maxlength="3" value="">
</NOBR>
</TD>
</TR>
<TR>
<TD nowrap bgcolor="#99CCCC" align="left" valign="middle">
  subnet mask </TD>
...

</TR>
...

</TABLE>
<BR>
<INPUT type=submit value "SET"> <INPUT type=reset value="REDO">
</FORM>
</BODY>
</HTML>
```

FIG. 6

From: <sampleB@sample.co.jp>
To: <sampleA@sample.co.jp>
Subject: POST REPLY SAMPLE
MIME-Version: 1.0
Content-Type: application/octet-stream;name="POSTDATA.ATT"
Content-Transfer-Encoding: 7bit ———————————————7d216791703c2
Content-Disposition: form-data; name="ip4"

192
———————————————7d216791703c2
Content-Disposition: form-data; name="ip3"

168
———————————————7d216791703c2
Content-Disposition: form-data; name="ip2"

1
———————————————7d216791703c2
Content-Disposition: form-data; name="ip1"

100
———————————————7d216791703c2
Content-Disposition: form-data; name="sub4"

255
———————————————7d216791703c2
Content-Disposition: form-data; name="sub3"

255
———————————————7d216791703c2
(ABBREVIATED)

———————————————7d216791703c2
Content-Disposition: form-data; name="1stdns1"

200
———————————————7d216791703c2
Content-Disposition: form-data; name="2nddns4"

———————————————7d216791703c2
Content-Disposition: form-data; name="2nddns3"

———————————————7d216791703c2
Content-Disposition: form-data; name="2nddns2"

———————————————7d216791703c2
Content-Disposition: form-data; name="2nddns1"

———————————————7d216791703c2—

COMMUNICATION DEVICE AND METHOD FOR CONTROLLING COMMUNICATION DEVICE

FIELD OF THE INVENTION

The present invention relates to a communication device that is capable of device setting from a remote device.

DESCRIPTION OF THE RELATED ART

Conventionally, to carry out a device setting of a device, the device setting is carried out by operating an operation panel or the like that is provided on the device. However, due to complicity, or low operationality as a result of using keys or the like on limited operation panels, a communication device in which the device setting can be carried out from a remote device is being developed. As a conventional method for carrying out the device setting from a remote device, for example, a method is being developed for a facsimile machine wherein a telephone line that is used for a facsimile communication is used to carry out the device setting. However, generally, an exclusive remote device that can communicate with the communication device is necessary, or when a manufacturer or a type of communication device differs, another remote device is necessary. There was also a case in which it is necessary to change the remote device. Therefore, there is no remote device that can be used easily by the user of the communication device for the device setting.

Recently, a communication device such as an Internet facsimile machine has been developed that can carry out a communication via a network, such as an IP (Internet Protocol) network. In the communication device that can communicate via the network, the device setting can be carried out from the remote device by using the network. As one method that is used when carrying out the device setting, for example, there is a method of using an electronic mail transmission and reception function which the communication device such as the Internet facsimile machine is generally provided with, describing a device setting information or the like in a certain format in the electronic mail, and having the electronic mail be received by the communication device, to carry out the device setting. However, under the conventional method of the device setting using the electronic mail, it was necessary to describe a command or the like in a certain format in the electronic mail for the device setting, and it was not a format which the general user can easily describe. Therefore, it was not easy for the user to carry out the device setting by using the method of the device setting using the electronic mail.

Furthermore, there is another method used for carrying out the device setting. According to this method, the communication terminal, which includes a function HTTP (Hyper Text Transfer Protocol) server, uses a browser provided in the remote device to access to the communication device to open a web page for the device setting. Then, the device setting is carried out. According to this method, the user can carry out the device setting easily by using the remote device such as a terminal connected to the network, without operating the operation panel of the communication device. Moreover, the setting items or the like can be displayed graphically on the browser, and the user can carry out the setting easily.

However, since the remote device accesses directly to the communication device to download the web page for the setting device, and then to upload, there are cases when the communication device cannot be accessed from the remote device. For example, when trying to carry out the setting of the communication device located within an intranet from the remote device connected to a remote network, the access is rejected by a firewall, and the device setting cannot be carried out. Therefore, a method in which the communication device is accessed directly by using the browser is not necessarily an effective means.

SUMMARY OF THE INVENTION

The present invention was made in consideration to the above circumstance. It is thus an advantage of the present invention to provide a communication device in which a user can easily carry out a device setting from a remote device.

According to the present invention, the communication device includes a communication means that can transmit and receive an electronic mail via a network. In addition, the communication device includes a control means that forms the device setting form-data described as a structured document, transmits the formed device setting form-data as an electronic mail from the communication means, and updates the device setting by the device setting data received as an electronic mail by the communication means. According to this structure, the remote device can just include an electronic mail transmission and reception environment, and an environment in which the structured document can be edited. For example, by describing the device setting form-data in the HTML (Hyper Text Markup Language), the XML (eXtensible Markup Language), or the like, reference and input of data can be carried out by using a browser or the like that is used generally. As a result, the user can carry out the device setting easily from a remote device. Moreover, by carrying out a transmission and a reception by an electronic mail, for example, even when it is a communication device within an intranet, the device setting can be carried out from other networks or the like, and the convenience of the device setting from the remote device is not lost. Furthermore, since the device setting form-data transmitted from the communication device is independent of makers or types of devices, it is not necessary to prepare the device setting data for each type of remote device.

Further, an electronic mail address of the return destination can be designated within the device setting form-data to be transmitted from the communication device to the remote device that carries out the device setting. Accordingly, for example, the electronic mail address that is to be the transmitter of the device setting form-data, and the electronic mail address of the return destination can be set differently.

Moreover, when forming the device setting form-data, by embedding the present device setting data, the present setting data can be confirmed from the remote device, or the device setting can be carried out easily from the remote device.

Thus, according to the present invention, since the electronic mail is used when carrying out the device setting, a remote maintenance of the communication device can be carried out from outside of the firewall, or from any place by a remote operation. In addition, since the device setting form-data is described as the structured document, special hardware or software in not necessary at the remote device that the user operates. Moreover, inputting and editing of the device setting data can be carried out easily by a visual interface, and the operationality can be improved.

BRIEF DESCRIPTION OF THE DRAWINGS

FIG. 3 is a view showing an example of an electronic mail including a device setting form-data.

FIG. 4 is a view showing an example of the device setting form-data.

FIG. 6 is a view showing an example of an electronic mail including the device setting data.

DETAILED DESCRIPTION OF THE PREFERRED EMBODIMENTS

Figure 1:
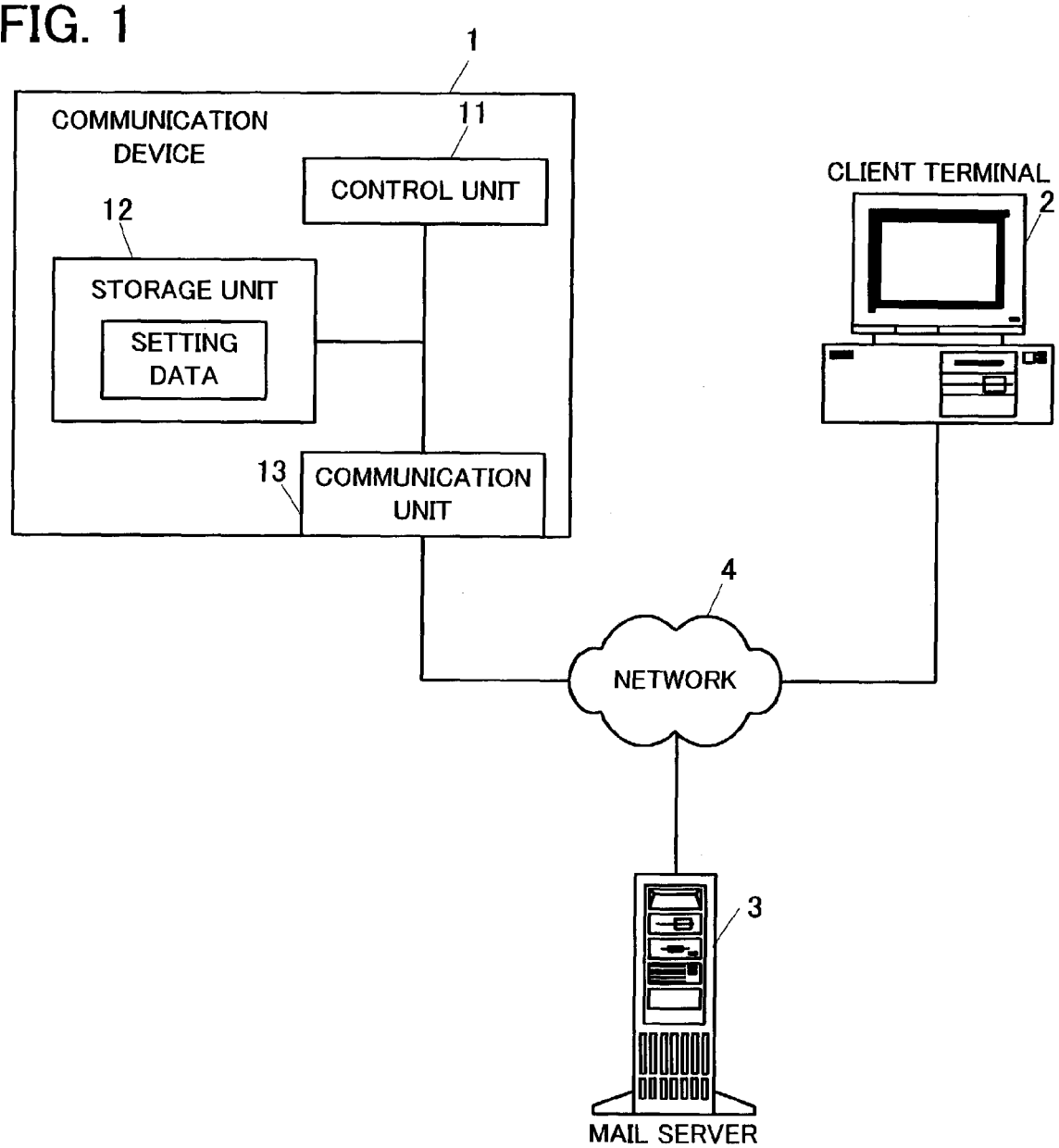
FIG. 1 is a view showing an example of a communication system including a communication device of the present invention.

FIG. 1 is a view showing an example of a communication system including a communication device of the present invention. In the drawings, the reference number 1 is a communication device, 2 is a client terminal, 3 is a mail server, 4 is a network, 11 is a control unit, 12 is a storage unit, and 13 is a communication unit. The communication device 1 is a device that performs various functions. Moreover, a device setting of the communication device 1 when performing various functions can be carried out from a remote location by using electronic mail. Therefore, the communication device 1 includes at least an electronic mail transmission and reception function such as the SMTP (Simple Mail Transfer Protocol), the POP (Post Office Protocol) or the like.

The communication device 1 includes the control unit 11, the storage unit 12, the communication unit 13 or the like. The control unit 11 controls the entire communication device 1. In addition, the control unit 11 performs various functions in accordance with setting data stored in the storage unit 12. Moreover, to enable the device setting from the remote location, the control unit 11 forms a device setting form-data that is described as a structured document, in the HTML (Hyper Text Markup Language) or in the XML (eXtensible Markup Language), and transmits the device setting form-data from the communication unit 13 as an electronic mail message. In addition, the control unit 11 includes a function for updating the device setting in accordance with the device setting data received as the electronic mail message by the communication unit 13. Further, when forming the device setting form-data, the control unit 11 can obtain the setting data stored in the storage unit 12, the data that can be obtained from various auxiliary devices, or the like. In addition, present device setting data can be embedded in the device setting form-data. Moreover, an electronic mail address of a return destination can be designated within the device setting form-data to be transmitted.

The storage device 12 is formed from various storage mediums, such as RAM (Random Access Memory), ROM (Read Only Memory), a hard disk or the like. The storage device 12 can store various data that is necessary to be saved in the communication device 1. Of course, the storage device 12 can also store data that is used temporarily, programs necessary for the control unit 11 to operate, or the like. The storage device 12 can also store all or a part of the setting data that is set for the communication device 1. Further, the setting data should be stored in a medium that does not lose the stored setting data even when a power source is shut off.

The communication unit 13 carries out a communication via the network 4. The communication unit 13 includes a communication function by communication protocols, such as the SMTP, the POP or the like, for transmitting and receiving the electronic mail message especially in cooperation with the control unit 11. In other words, when transmitting the electronic mail message, the communication unit 13 transmits the electronic mail message by the SMTP to the mail server 3 via the network 4. Moreover, when receiving the electronic mail message, the communication unit 13 inquires to the mail server 3 via the network 4 by the POP, whether or not an electronic mail message has arrived in the mail server 3. When the electronic mail message has arrived in the mail server 3, the communication unit 13 receives the electronic mail message from the mail server 3.

The network 4 is formed from an IP network, such as a LAN (Local Area Network), the Internet, or the like. The network 4 is connected with the communication device 1, and other various devices. In FIG. 1, as one example, the network 4 is also connected with the mail server 3, which belongs to the same domain with the communication device 1, and the client terminal 2, which is a remote device that performs the device setting. The mail server 3 distributes the electronic mail message received from the communication device 1 to a mail server of a domain of the destination address. In addition, the mail server 3 accumulates the electronic mail message being transmitted from other mail servers of which is addressed to a client within the domain where the mail server 3 belongs, and distributes the electronic mail message according to demand. Moreover, the client terminal 2 is a network device that can communicate via at least the network 4. The client terminal 2 can be any kind of a device if the device can transmit and receive electronic mail messages, and display or edit the received data by a browser.

Figure 2:
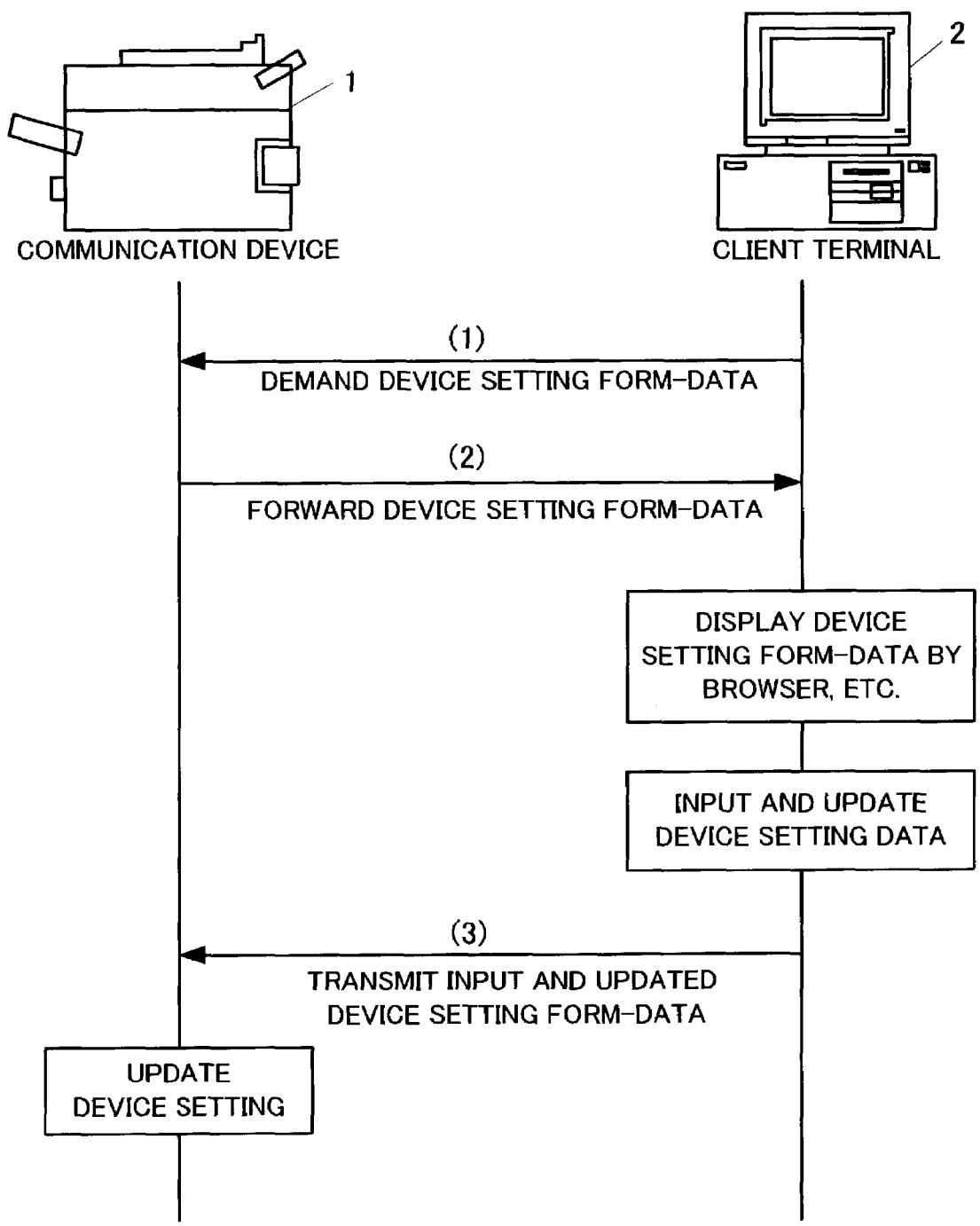
FIG. 2 is a view showing an example of an operation of when carrying out a device setting in an example of the communication system including the communication device of the present invention.

FIG. 2 is a view showing an example of an operation when carrying out the device setting in an example of the communication system including the communication device of the present invention. An example will be described in which the device setting of the communication device 1 is carried out from the client terminal 2 by using the above-described communication system. When the device setting of the communication device 1 is attempted to be carried out from the client terminal 2, first in (1), the client terminal 2 transmits an electronic mail message to the communication device 1 to demand a forwarding of the device setting form-data. The format or the contents of the electronic mail message for demanding the forwarding of the device setting form-data can be decided in advance, and can be in any format or any contents. Specifically, a command or a password for demanding the transmission of the device setting form-data is described in a header part or a main text of the electronic mail message.

The communication device 1 that received the electronic mail message demanding the forwarding of the device setting form-data forms the device setting form-data in structured document format, such as in the HTML or in the XML. Further, the communication device 1 can authenticate whether or not the electronic mail message is from a user having authority for carrying out the device setting in accordance with a transmitter or a password of the electronic mail message. Then, only when the demand is from the user having the authority for the device setting, the communication device 1 can form the device setting form-data.

When forming the device setting form-data, for example, in the case of describing under the HTML format, the device setting form-data is not limited to only a list of settable items, and the layout, the display method or the like can be contrived such that the formed device setting form-data is easily understandable to the user who uses the device setting form-data. Moreover, even for the setting items that are to be held as a numeric value inside, the setting items can be described in a way to assist the user during the setting, for example, such that the user can select and input the setting items under easily understandable description.

Moreover, for the device setting form-data that is to be formed, for example, the setting data stored in the storage unit 12 can be fetched, or a setting state, a status or the like can be obtained from each part within the device (not shown in the drawings), and the obtained information can be embedded in the device setting form-data. Furthermore, the electronic mail address of a return destination to which the device setting form-data is returned after the device setting, can be included in the device setting form-data.

In (2), the formed device setting form-data is transmitted as an electronic mail message from the communication unit 13 via the network 4 to the transmitter of the electronic mail message that demanded the device setting form-data. The device setting form-data can be transmitted as the main text of the electronic mail message, or as an attached file. The electronic mail message is transmitted to the mail server 3, and then, when the domain including the address is different from the domain of the mail server 3, the electronic mail message is forwarded to the mail server that has control over that address. Then, the client terminal 2 demands to receive the electronic mail message from the mail server 3, and the electronic mail message including the device setting form-data arrives in the client terminal 2.

The client terminal 2 displays the device setting form-data within the received electronic mail message by a browser or the like, and the device setting can be carried out accordingly. At this time, the device setting form-data is described in the structured document format as described above. The device setting form-data can be displayed and edited easily by a general browser, editor, or the like. For example, when the setting data or the like is embedded, just by displaying the device setting form-data within the received electronic mail message, the setting condition can be referred, or the setting condition can be checked. When forming the device setting form-data at the communication device 1 side as described above, since the device setting form-data can be formed by considering the display format or the like, the setting data can be provided to the user at the client terminal 2 as it has been intended at the communication device 1 side.

The user inputs the data that should be set within the device setting form-data at the client terminal 2, or updates the data being inserted. It is not necessary for the user to input for all the items, and the user can input or update the data only for the item that should be set.

When the input and the updating of the setting data are completed, in (3), the client terminal 2 transmits the input and updated device setting form-data to the communication device 1 as an electronic mail message. At this time, when receiving the electronic mail message including the device setting form-data, in the case the electronic mail address of the return destination is included, the input and updated device setting form-data can be returned as the updated data by using such an electronic mail address. The device setting form-data can be described so that the input and updated device setting form-data can be returned by operating a "set" button or the like that is provided within the device setting form-data.

The communication device 1 that received the electronic mail message including the updated data analyzes the contents, and obtains the updated data for each setting item. Then, the communication device 1 stores the obtained updated data as the setting data in the storage unit 12, and indicates to change the operation to each part according to necessity based on the updated setting data. Alternatively, for example, by resetting the communication device 1, the communication device 1 can be initialized in accordance with the updated setting data. Further, the communication device 1 can authenticate whether or not the electronic mail message is from a user having an authority for carrying out the device setting in accordance with a transmitter or a password of the electronic mail message. Then, only when the demand is from the user having the authority for the device setting, the communication device 1 can change the device setting form-data. Then, it is preferable to return an update result report or transmit to a manager after updating the device setting.

As described above, the device setting for the communication device 1 can be carried out at the client terminal 2 by using the electronic mail message. At this time, since the electronic mail message is used, even when the communication device 1 is a device within a system that is protected by a firewall, the device setting of the communication device 1 can be carried out from the remote location. Moreover, if the client terminal 2 can refer or edit the electronic mail message, a special hardware or software is unnecessary, and the device setting can be carried out by using the browser, the editor or the like that are used generally. Furthermore, by describing the device setting form-data as the structured document such as in the HTML, the client terminal 2 can easily carry out the device setting by using a visual man-machine interface. Moreover, by embedding the setting data of that time in the device setting form-data, the device setting can be confirmed remote by the client terminal 2.

An example of the above operation will be described by using a specific example. FIG. 3 is a view showing an example of an electronic mail message including the device setting form-data. FIG. 4 is a view showing an example of the device setting form-data. In (1) of FIG. 2, the client terminal 2 transmits the electronic mail message to the communication device 1 for demanding the forwarding of the device setting form-data. The communication device 1, which received the electronic mail message, forms the device setting form-data of HTML format as shown in FIG. 4 as an example. In this example, the device setting form-data for carrying out the network setting of the communication device 1 is shown, and some parts are abbreviated. Each input item is as shown under tabular form, and carries out the setting of layout. Moreover, as shown with an arrow in FIG. 4, the electronic mail address of the return destination is included.

The formed device setting form-data is transmitted as an electronic mail message from the communication unit 13 via the network 4 to the transmitter of the electronic mail message that demanded the device setting form-data in (2). An example of the electronic mail message to be transmitted is shown in FIG. 3. In FIG. 3, an example is shown in which the device setting form-data is transmitted as an attached file of an electronic mail message (in this example, a filename is "FormSample.htm"). Further, in the example shown in FIG. 3, the device setting form-data is encoded by MIME (Multipurpose Internet Mail Extensions) or the like.

Figure 5:
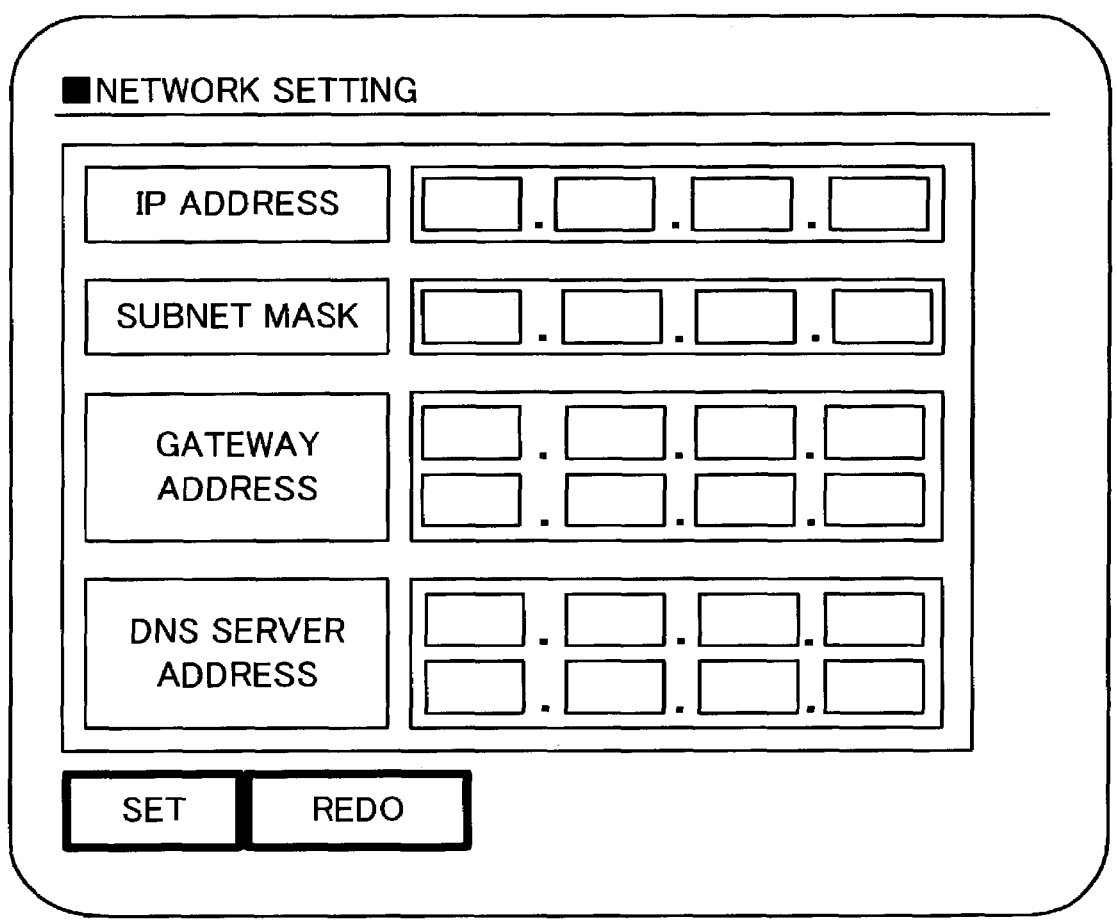
FIG. 5 is a view showing an example of a display format of the device setting form-data.

When receiving the electronic mail message as shown in FIG. 3, the client terminal 2 decodes the device setting form-data, and the filename "FormSample.htm" is formed. The user can display the device setting form-data by a general browser or the like. FIG. 5 is a view showing an example of a display format of the device setting form-data. By displaying the HTML data shown in FIG. 4 by the browser, a display screen as shown in FIG. 5 as an example is presented to the user. The layout of the display screen is described within the HTML data when the device setting form-data is formed at the communication device 1 side. The setting data as intended at the communication device 1 side can be presented to the user.

The user inputs the IP address or the like on this screen. Further, the user can input only the necessary items, and the items that can be kept as is can be left blank. The processing for when leaving an item blank can be decided at the communication device 1 side. After inputting the necessary data, by clicking the "set" button shown in the lower part of FIG. 5, the setting is completed.

When the user clicks the "set" button, the electronic mail message including the input setting data as shown in FIG. 6 is transmitted automatically to the electronic mail address of the return destination, shown with an underline in FIG. 4 (in (3) of FIG. 2). The electronic mail address is the same as the transmitter of the device setting form-data in this example. However, the electronic mail address shall not be limited to this example. The communication device 1, which received the electronic mail message transmitted from the client terminal 2, analyzes the contents, obtains the updated data for each setting item, and carries out the device setting.

As described above, the device setting remotely can be carried out just by demanding the device setting form-data from the communication device 1, displaying the device setting form-data within the received electronic mail message by a general browser or the like, inputting the data accordingly, and clicking the "set" button. The client terminal 2 can communicate by using the network 4, and can be including a general browser or the like. The client terminal 2 can carry out the device setting of the communication device 1 remotely without using any special software or the like.

Further, in the above-described specific example, the present setting data is not included in the device setting form-data transmitted from the communication device 1 to the client terminal 2. However, it is possible to embed the present setting data in the HTML data shown in FIG. 4. In this case, when the user displays the device-setting form data by using the browser or the like, the present setting data is displayed. Therefore, the user can refer to the present state. In addition, the user can carry out the device setting by referring to the present state, and the user can easily input the setting data. Moreover, corrections can be made in a unit of a single digit number or one letter, and the time required for inputting the setting data can be saved. In addition, in the above-described specific example, a case in which the network setting is carried out was shown. However, the present invention shall not be limited to this example, and the device setting by the remote can be carried out in the same manner also for any device setting items.

In the operational example shown in FIG. 2 and the specific example described thereafter, the electronic mail message for demanding the device setting form-data is transmitted from the client terminal 2 when carrying out the device setting. However, the present invention shall not be limited to these examples. For example, the user can operate the communication device 1 to transmit the device setting form-data to a desired destination (electronic mail address), or the two examples can be used together.

Moreover, when the communication device 1 and the client terminal 2 exist within an intranet, or when the communication device 1 and the client terminal 2 are connected directly by a small scaled LAN or the like, there are cases when the mail server 3 does not exist, or when it is convenient to use the protocol such as the HTTP instead of electronic mail. To deal with these cases, it can be formed to be able to handle the device setting by the protocol such as the HTTP. In this case, the communication device can determine whether the demand for the device setting form-data is received as an electronic mail or as a HTTP request. Then, the communication device can form and return the device setting form-data following the protocol of which received the demand. For example, when receiving the demand for the device setting form-data as an electronic mail message, as described in the operational example, the device setting form-data for the electronic mail message is formed and returned. Moreover, when receiving the demand for the device setting form-data by the HTTP request, the device setting form-data can be formed such that the device setting form-data set and changed can be received by the HTTP, and the device setting form-data can be returned to the demanded origin.

Moreover, the communication device 1 can be any communication device, and for example, the communication device 1 can be a device having a copy function, an Internet facsimile machine having a facsimile communication function, or other various network devices.

What is claimed is:

1. A communication device, comprising:
   means for transmitting and receiving an electronic mail message and HTTP request via a network;
   means for determining whether a demand for a device setting form-data has been received as the electronic mail message or the HTTP request;
   means for forming a device setting form-data described as a structured document containing device settings of the communication device to be remotely updated by a recipient,
   wherein the formed device setting form-data is configured to cause display on a recipient terminal of a plurality of entry fields for input of updated device settings, and containing means for the recipient to automatically return the structured document with the updated device settings input by the recipient into the entry fields to the communication device, transmitting the formed device setting form-data in accordance with the received electronic mail message or HTTP request from the means for transmitting and receiving, and updating the device settings of the communication device according to a responsive electronic mail message received by the means for transmitting and receiving and including the structured document containing the updated device settings input by the recipient; and
   means for embedding a present device setting data when forming the device setting form-data, the formed present device setting data being configured to cause display of the embedded present device setting data in the plurality of entry fields on the recipient terminal.

2. The communication device according to claim 1, wherein the means for forming designates an electronic mail address of a return destination in a device setting form-data to be transmitted.

3. The communication device according to claim 1, wherein the means for forming transmits the device setting form-data in accordance with a reception of an electronic mail message demanding a transmission of the device setting form-data.

4. The communication device according to claim 1, wherein the means for forming transmits the device setting form-data, after receiving an electronic mail message demanding a transmission of the device setting form-data, and carrying out an authentication.

5. The communication device according to claim 1, further comprising a means for carrying out an indication to the communication device, wherein the means for forming transmits the device setting form-data in accordance with an indication from the means for carrying out an indication.

6. The communication device according to claim 1, wherein the means for forming carries out an authentication when updating the device setting by the device setting data.

7. The communication device according to claim 1, wherein the means for forming returns an update result as an electronic mail message by the means for transmitting and receiving after updating the device setting.

8. The communication device according to claim 1, wherein the structured document is in the HTML (Hyper Text Markup Language).

9. The communication device according to claim 1, wherein the structured document is in the XML (eXtensible Markup Language).

10. The communication device according to claim 1, wherein the means for the recipient to automatically return the structured document comprises a set button displayed on the recipient terminal that causes the structured document to be electronically mailed to the communication device.

11. A method for controlling a communication device, comprising:
receiving a demand for a device setting form-data as an electronic mail message or an HTTP request;
forming a device setting form-data described as a structured document containing device settings of the communication device to be remotely updated by a recipient, wherein the formed device setting form-data is configured to cause display on a recipient terminal of a plurality of entry fields for input of updated device settings, and containing means for the recipient to automatically return the structured document with the updated device settings input by the recipient into the entry fields to the communication device;
embedding a present device setting data when forming the device setting form-data, the formed present device setting data being configured to cause display of the embedded present device setting data in the plurality of entry fields on the recipient terminal;
transmitting the formed device setting form-data in accordance with the received electronic mail message or HTTP request;
receiving a responsive electronic mail message including the structured document containing updated device settings input by the recipient; and
updating the device settings of the communication device according to the updated device settings.

12. The method for controlling the communication device according to claim 11, further comprising designating an electronic mail message of a return designating in the device setting from—data to be transmitted.

13. The method for controlling the communication device according to claim 11, further comprising transmitting the device setting form-data in accordance with a reception of an electronic mail message demanding a transmission of the device setting form-data.

14. The method for controlling the communication device according to claim 11, further comprising transmitting the device setting form-data after receiving an electronic mail message demanding a transmission of the device setting form-data, and carrying out an authentication.

15. The method for controlling the communication device according to claim 11, further comprising:
receiving an indication from an operation unit, and
transmitting the device setting form-data in accordance with the indication.

16. The method for controlling the communication device according to claim 11, further comprising carrying out the authentication when updating the device setting by the device setting data.

17. The method for controlling the communication device according to claim 11, further comprising returning an update result as an electronic mail message after updating the device setting.

18. The method for controlling the communication device according to claim 11, further comprising providing the structured document in the HTML (Hyper Text Markup Language).

19. The method for controlling the communication device according to claim 11, further comprising providing the structured document in the XML (eXtensible Markup Language).

20. The method for controlling the communication device according to claim 11, wherein the means for the recipient to automatically return the structured document comprises a set button displayed on the recipient terminal that causes the structured document to be electronically mailed to the communication device.

* * * * *